United States Patent
Singh

[11] Patent Number: 5,952,027
[45] Date of Patent: Sep. 14, 1999

[54] METHOD FOR BROWNING PRECOOKED, WHOLE MUSCLE MEAT PRODUCTS

[75] Inventor: Prem S. Singh, Glen Ellyn, Ill.

[73] Assignee: Swift-Eckrich, Inc., Downers Grove, Ill.

[21] Appl. No.: 09/075,608

[22] Filed: May 11, 1998

[51] Int. Cl.⁶ .......................... A23L 1/025; A23B 4/044
[52] U.S. Cl. .......................... 426/305; 426/103; 426/237; 426/241; 426/250; 426/262; 426/268; 426/270; 426/293; 426/302; 426/315; 426/641; 426/643; 426/644; 426/645; 426/647; 426/652
[58] Field of Search .......................... 426/92, 103, 237, 426/241, 242, 248, 250, 262, 268, 270, 293, 302, 305, 315, 641, 643, 644, 645, 647, 652, 240

[56] References Cited

U.S. PATENT DOCUMENTS

| | | | |
|---|---|---|---|
| 1,280,772 | 10/1918 | Legg | 426/315 |
| 1,502,905 | 7/1924 | Colgin | 426/262 X |
| 3,106,473 | 10/1963 | Hollenbeck | 99/229 |
| 4,372,981 | 2/1983 | Lieberman | 426/315 X |
| 4,657,765 | 4/1987 | Nicholson et al. | 426/262 X |
| 4,753,809 | 6/1988 | Webb | 426/315 X |
| 4,810,510 | 3/1989 | Lever et al. | 426/315 X |
| 4,876,108 | 10/1989 | Underwood et al. | 426/650 |
| 4,882,184 | 11/1989 | Buckholz et al. | 426/262 X |
| 4,968,522 | 11/1990 | Steinke et al. | 426/262 X |
| 4,985,261 | 1/1991 | Kang et al. | 426/262 X |
| 4,994,297 | 2/1991 | Underwood et al. | 426/650 |
| 5,013,567 | 5/1991 | Govenius | 426/315 X |
| 5,039,537 | 8/1991 | Underwood | 426/271 |
| 5,292,541 | 3/1994 | Underwood et al. | 426/250 |
| 5,397,582 | 3/1995 | Underwood et al. | 426/250 |
| 5,429,831 | 7/1995 | Williams et al. | 426/92 |
| 5,762,985 | 6/1998 | Eisele | 426/315 |

*Primary Examiner*—Milton Cano
*Attorney, Agent, or Firm*—Pretty, Schroeder & Poplawski

[57] ABSTRACT

A method of producing a crisp surface and imparting a uniform golden-brown color to a precooked whole muscle meat product by coating at least a portion of the surface of a precooked whole muscle meat product with a browning liquid pyrolysis product. The coated surface is then exposed to an energy source that selectively heats the coated surface of the whole muscle meat product at a temperature and for a time sufficient to develop a golden-brown color on the exposed surface, without substantially shrinking the precooked whole muscle meat product.

36 Claims, No Drawings

METHOD FOR BROWNING PRECOOKED, WHOLE MUSCLE MEAT PRODUCTS

BACKGROUND OF THE INVENTION

1. Field of the Invention

This invention relates to a method for preparing food products. In particular, it relates to a method for browning precooked, whole meat muscle products.

2. Description of Related Art

There exists a strong consumer demand for precooked, whole muscle meat products, such as precooked meat, poultry, and fish products having the appearance, texture, and taste of products that are naturally smoked or baked or roasted in a home-style oven. For example, consumers place a premium on precooked, whole muscle meat products that have the same golden brown color, crisp surface, and moist interior as their home-cooked counterparts.

While the consumer demand for such precooked products is dramatically increasing because of the products' convenience, consumers also demand that these products be healthful, nutritional, and low in fat. Consequently, to satisfy these sometimes conflicting demands, and to be successful in the marketplace, products must not only have the appearance, texture, and taste of their home-cooked counterparts, but they also must be wholesome.

It has proved especially difficult to prepare precooked, whole muscle meat products, such as precooked deli turkey breasts, chicken nuggets, pork chops, and the like having a golden brown color on a crispy surface. A conventional approach has been to deep fry these products in various kinds of edible seed oils such as cotton seed oil, peanut oil, corn oil, coconut oil, sunflower seed oil, etc. at temperatures in the range of from about 300° to about 450° F. (from about 150° to about 230° C.). Deep frying produces a desirable browning on the surface of the meat product through a reaction known as the Maillard Browning Reaction. The Maillard Browning Reaction takes place when common elements of the food product, such as amino acids, sugars, collagen and even minerals, react in a complex manner. Furthermore, deep frying produces a crisp surface while leaving a moist interior.

There are numerous drawbacks to deep-frying foods, however. They include a residual oily flavor and mouthful, as well as the adverse characterization of the product as being a high fat product, because of the oil that remains embedded in the product's surface. Moreover, the oil can degrade over time, thereby, affecting the product's shelf-life and taste. The use of the high-temperature oil also gives rise to safety concerns, by creating the potential for fires or burns.

Another conventional approach to browning precooked, whole muscle meat products begins with the application to the surface of the meat products of certain browning liquids produced by pyrolyzing wood or cellulose, such as "liquid smokes." The pyrolysis products develop a brown color on the product surface when the coated product is heated for about two hours to about six hours in a batch-type oven at a temperature of from about 120° to about 212° F. (from about 50° to about 100° C.) or for about ten minutes to about forty-five minutes in a circulating air oven or impingement air oven at a temperature from about 250° to about 600° F. (from about 120° to about 320° C.). Useful liquid smoke products are disclosed in Hollenbeck U.S. Pat. No. 3,106,473 and Underwood U.S. Pat. No. 4,876,108. The pyrolysis products, however, impart a smoky taste. Obviously, there are delicately flavored meat products, such as poultry and fish products, where a smoke flavor is not desired, so that the use of liquid smokes does not provide a viable alternative.

Recently, there have been developed browning liquid pyrolysis products from sugars, such as fructose and dextrose. The smoky taste of the sugar pyrolysis products is greatly reduced, but not always eliminated. These products are described in Underwood U.S. Pat. Nos. 5,397,582, 5,292,541, 5,039,537, and 4,994,297. For example, U.S. Pat. No. 5,397,582 describes coating a precooked sausage and then browning the coated sausage by heating in a microwave oven for about two minutes. While the sausage is browned by the sugar pyrolysis products, the color is not the golden brown associated with products that are naturally smoked or baked or roasted in a home-style oven.

Significant drawbacks remain with the conventional method of browning whole meat muscle products, even with these sugar pyrolysis products. Not only does their residual taste remain factor, but after being heated to temperatures of from about 120° to about 600° F., the meat products lose a significant amount of water that can adversely affect their taste and appearance.

Further, the uniformity of browning obtained the with pyrolysis products and the retention and stability of the brown coating, as well as the color itself, is less than desirable. Still further, because the whole meat muscle products are heated at elevated temperatures for relatively long periods of time, the growth of microbes is facilitated, thus decreasing the shelf-life of the browned whole muscle products. It is a further disadvantage of heating whole meat muscle products at elevated temperatures for relatively long periods of time that large amounts of heat are captured by the product. The product must then be chilled, i.e., the large amount of heat removed. Typically, chilling requires a lengthy, capital-intensive chill tunnel.

Thus, there remains a definite need for an effective method for browning precooked, whole muscle meat products to produce products having the appearance, texture, and taste of their naturally smoked or home-style baked or roasted counterparts. There remains a further definite need for an effective method for crisping and browning the surface of precooked, whole muscle meat products without deep frying. There remains a still further definite need for an effective method for browning mild-flavored or flavorless precooked, whole muscle meat products without imparting a smokey or other unwanted flavor. There remains a still further definite need for an effective method for crisping and browning the surface of precooked, whole muscle meat products that does not cause the products to shrink and their interior to become dried-out. There remains a still further definite need for an effective method for preparing whole muscle meat products having a uniform golden-brown color that is stable and retained throughout the life of the product. There remains a still further definite need for an effective method for crisping and browning a whole muscle meat product that does not adversely affect the shelf-life of the meat product and does not require the removal of great amounts of heat to chill the product. The present invention satisfies these and other needs and provides further related advantages.

SUMMARY OF THE INVENTION

The present invention, which addresses the above needs is embodied in a method of producing a crisp surface and imparting a uniform golden-brown color that is stable and retained throughout the life of a precooked, whole muscle meat product without imparting an objectionable smoky flavor, without forming an oily surface, without substantially shrinking the meat product, and without adversely affecting the shelf-life of the meat product, but instead, increasing the shelf-life and sensory quality of the product. In some embodiments, a precooked whole muscle meat product, including a poultry product, such as a turkey breast, a chicken breast, or chicken nugget, a ham product, a pork product, or a fish product, is pre-dried to remove free water from its surface. In accordance with the inventive method, at least a portion of the surface of the pre-cooked whole muscle meat product is coated with a browning liquid pyrolysis product. The coated surface is then exposed to an energy source that selectively heats the coated surface of the whole muscle meat product at a temperature and for a time sufficient to develop a golden brown color on the exposed surface, without substantial shrinkage of the precooked, whole muscle meat product.

Suitable energy sources include circulating air ovens, impinging air ovens, laser light sources, medium wavelength energy infra red radiation sources, and sources of microwave radiation. In some embodiments, the energy sources create an environment having a temperature greater than about 60° C. And in some embodiments, the temperature at the core of the meat product is initially less than about 5° C., while after the meat product has been browned, the temperature at the core of the meat product remains at less than about 13° C.

In some embodiments, the browning liquid pyrolysis product is obtained from the pyrolysis of hardwoods or sugars, including dextrose, and from about 0.05 to about 1.0 wt. %, based on the weight of the precooked, whole muscle meat product, of the browning liquid is applied to the surface of the meat product. Also in some embodiments, the browning liquid pyrolysis product contains a masking agent or flavoring enhancing composition. In some embodiments where the whole muscle meat product is a turkey breast, the browning liquid pyrolysis product contains from about 0.5 to about 15 wt. % turkey flavor or turkey broth or a mixture of the two as the masking agent or flavoring enhancing composition.

Other features and advantages of the present invention will become apparent from the following detailed description, which illustrates by way of example, the principles of the invention.

DETAILED DESCRIPTION OF THE PREFERRED EMBODIMENTS

Any whole meat muscle product can be advantageously browned in accordance with the invention. Representative whole meat muscle products include poultry, meat, and fish products, such as turkey breasts, chicken breasts, chicken nuggets, ham products, pork products, and the like. The whole meat muscle products can be precooked by any conventional method. Typical methods include initially stuffing a raw whole muscle meat product into a polymeric bag and then sealing the bag. Alternatively, the raw whole muscle meat product is formed in a mold. The raw meat product is then cooked in a smoke house, or steam box, or circulating air oven. After cooking, the whole muscle meat product is chilled by showering with cold water followed by cooling with chilled air to reduce its equilibrium temperature to less than about 40° F. (less than about 5° C.). The thus precooked, chilled, whole muscle meat product is then removed from the polymeric bag or mold.

In some embodiments, the precooked, whole muscle meat product is then placed on a continuously moving conveyor and transported past a series of hot water (e.g., from about 90° to about 212° F.) or steam showers for a period of from about ten to about thirty seconds. The showers remove the gelatin purge formed on the surface of the meat product during cooking. It has been found that the inventive method is more effective if the browning liquid pyrolysis product it applied directly to the surface of the whole muscle meat product and not to an intermediate gelatin layer. Direct application promotes penetration of the browning liquid pyrolysis product into the meat tissue and facilitates the subsequent Maillard Browning Reaction.

After the gelatin purge is removed, the meat product is predried by circulating hot air around the product or by exposing the product to infra-red radiation. It is also been found that when the free water on the surface of the meat product is removed by predrying, the Maillard Browning Reaction is enhanced.

At least a portion of the surface of the thus dried, precooked, whole meat muscle product is then coated with one or more of any suitable browning liquid pyrolysis product, such as the browning liquid pyrolysis products commercially available from Red Arrow Products Company, Inc. Manitowoc, Wis. and described in Hollenbeck U.S. Pat. No. 3,106,473 and Underwood U.S. Pat. Nos. 5,397,582, 5,292,541, 5,039,537, 4,994,297, 4,876,108, which patents are herein incorporated by reference. Products useful in accordance with the inventive method include browning liquids obtained from the pyrolysis of hardwoods such as ST-300 liquid smoke and SELECT 24P liquid smoke both available form Red Arrow Products Company, Inc. Manitowoc, Wis., as well as browning liquids obtained from the pyrolysis of sugars such as MAILLOSE carmel coloring, also available from Red Arrow Products Company, Inc. Manitowoc, Wis.

The concentration of the commercially available products varies depending on the particular browning liquid pyrolysis product, the particular whole muscle meat product to be treated, the particular conditions for the Maillard Browning Reaction, and the desired final color. For example, Maillose is used without any dilution up to about 80 vol. % dilution with water. The higher the concentration of the Maillose or other browning liquid pyrolysis product, the darker golden-brown the final, whole meat muscle product.

In some embodiments, a masking agent or flavoring enhancing composition is included with the browning liquid. For example, in those embodiments where the meat product is a precooked turkey breast, from about 0.5 to about 15 wt. % turkey flavor or turkey broth or a mixture of the two can be added to the browning liquid. Honey and other flavors can also be added to the browning liquid to give a roasted aroma and enhance the flavor of the final product.

The browning liquid is applied to at least a portion of the surface of the precooked, whole muscle meat product by any suitable method, such as by dipping, brushing or spraying. The amount of browning liquid to be applied to the surface will depend on the particular combination of browning liquid, meat product, and color desired. The amount will be readily determinable by one skilled in the art without undue experimentation. Typically, the amount of browning liquid ranges from about 0.05 to about 1.0 wt. %, preferably from about 0.1 to about 0.8 wt. %, and more preferably from about 0.15 wt. % to about 0.3 wt. %, based on the weight of the precooked, whole muscle meat product.

The surface of the meat product is then browned and crisped using an energy source that selectively heats the thus coated surface. In preferred embodiments, the energy source selectively heats and dehydrates the surface of the meat product by creating an environment having a temperature greater than about 60° C., preferably from about 100° C. to about 290° C., and more preferably from about 150° C. to about 260° C. In those embodiments where the precooked meat product has been kept at its chilled equilibrium temperature of less than about 5° C., the selective heating maintains the core of the meat product at a temperature less than about 13° C., preferably less than about 8° C., and most preferably less than about 5° C.

In one preferred embodiment, the coated meat product is selectively heated and dehydrated using a circulating air oven. In another preferred embodiment, the coated meat product is selectively heated and dehydrated using an impinging air oven. Impinging air ovens cause hot air to be impinged on the top and bottom of the meat product, thereby breaking the boundary layer surrounding the product's surface. Suitable circulating air and impinging air ovens are available from Stein, Inc., Sandusky, Ohio, Convenience Food Systems, Avon, Mass., Heat and Control, Inc., Hayward, Calif., and Procter and Schwartz, Co., Horshau, Pa. Other energy sources for selectively heating and dehydrating the surface of the meat product provide energy in the form of laser light, medium wavelength infra red radiation or microwave radiation.

It has been discovered that the surface of the meat product can be selectively heated and dehydrated by exposing the surface to the energy source for a relatively short length of time. In accordance with the inventive method, a crisp surface having a golden-brown color will develop, without substantial moisture loss of the browned, precooked, whole muscle meat product. In accordance with the inventive process, the moisture loss of the meat product will be less than about 4% and in some embodiments less than about 3% or even less than about 1%, based on the initial weight of the meat product. Consequently, precooked, whole muscle meat products are produced which not only have highly desirable golden-brown color, but have the crisp surface and moist interior associated with naturally smoked or home-cooked products. Furthermore the golden-brown color is uniform and stable and retained throughout the life of the product without imparting an objectionable smoky flavor, without forming an oily surface, without substantially shrinking the meat product, and without adversely affecting the shelf-life of the meat product but instead, increasing the shelf-life and sensory quality of the product.

The following examples are included to further illustrate the invention. They are not limitations thereon.

EXAMPLE 1

A turkey breast was precooked in the following manner. An uncooked turkey breast was injected with a solution containing 82.8 wt. % water, 4.7 wt. % salt, 1.6 wt. % sodium tri-poly phosphate, 7.3 wt. % starch, 2.7 wt. % dextrose, and 0.9 wt. % flavorings. The resulting 36 wt. % injected turkey breast was tumbled and vacuumed packaged in a poly bag, then cooked in a steam box. After chilling to 39.7° F., the bag was removed from the turkey breast; gelatin purge was removed from its surface using a hot water spray; and the turkey was quickly predried using hot air. The precooked, cleaned, and dried turkey breast weighed 6.86 pounds.

A solution containing 300 ml of ST-300 (Red Arrow Co. in Manitowoc, Wis.), 200 ml of Select 24P (Red Arrow Co., Manitowoc, Wis.), and 3600 ml of water was mixed slowly to avoid excess foaming. The resulting browning liquid was applied to the surface of the turkey breast to form a coating weighing 0.03 pounds (0.4 wt. % based on the weight of the uncoated turkey breast).

The coated turkey breast was then placed in a circulating air oven. The turkey breast was browned with for eight minutes with by circulating air heated to 570° F. past both the top and the bottom of the product. The following temperature measurements were recorded:

Temperature before browning 40° F.

Temperature ¼" below surface during browning 104° F.

Temperature 1" below the surface during browning 85 ° F.

Core Temperature after Browning 43° F.

The following color measurements were also recorded for the browned turkey breast using a Hunter Lab Color-Meter:

| L* | A* | B* |
|---|---|---|
| 52.2 | 9.6 | 30 |

The weight of the browned turkey breast was 6.6 pounds, so that the weight loss was about 3.8%.

EXAMPLE 2

A precooked turkey breast was prepared using the procedure of Example 1. The precooked, cleaned, and dried turkey breast weighed pounds.

A browning liquid was then made of 50% (W/W) Maillose (Red Arrow Co., Manitowoc, Wis.) and water. The precooked turkey breast was dipped in the browning liquid for thirty seconds. The surface of the turkey breast picked up 0.02 pounds of this mixture to form a coating (0.3 wt. % based on the weight of the uncoated turkey breast).

The coated turkey breast was then placed in a circulating air oven. The initial temperature of the turkey breast was 40° F. The turkey breast was then browned with air heated to 535° F. circulated past the top, bottom, and sides of the product. A golden brown color was developed within a period of 5–6 minutes. Immediately after browning the core temperature was still 40° F.

The following color measurements were recorded for the browned turkey breast using a Hunter Lab Color-Meter:

| L* | A* | B* |
|---|---|---|
| 50 | 9.8 | 30.5 |

The weight of the browned turkey breast was 6.99 pounds, so that the weight loss during browning was 2.1%.

EXAMPLE 3

A turkey breast was precooked in the following manner. An uncooked turkey breast was injected with a solution containing 82.8 wt. % water, 4.7 wt. % salt, 1.6 wt. % sodium tri-poly phosphate, 7.3 wt. % starch, 2.7 wt. % dextrose, and 0.9 wt. % flavorings. The resulting 45 wt. % injected turkey breast was then tumbled and vacuumed packaged in a poly bag, then cooked in a steam box. After chilling to 39.7° F., the bag was removed from the turkey breast; gelatin purge was removed from its surface using a hot water spray; and the turkey was quickly predried using hot air. The weight of the precooked, cleaned, and dried turkey breast was 9.5 pounds.

The thus prepared turkey breast was submerged for thirty seconds in an undiluted solution of Maillose (Red Arrow Co., Manitowoc, Wis.). The coated turkey breast was then placed in a circulating air oven. The air in the oven was maintained at a temperature of 410° F. The velocity of the air across the coated turkey breast, as measured at the entry zone of the oven, was 3100 feet per minute. The turkey breast was heated for six minutes until a golden-brown color developed. The weight loss after browning was 3%.

The browned product was then chilled in a blast chiller to 40° F. and packaged. The following color measurements were recorded for the browned turkey breast using a Hunter Lab Color-Meter:

| L* | A* | B* |
|---|---|---|
| 53.2 | 14.3 | 39.9 |

EXAMPLE 4

A turkey breast was precooked using the procedure of Example 1. It weighed 7.56 pounds and had a protein content of 18.7 wt. %, a fat content of 18.9 wt. %, a moisture content of 74.3 wt. %, and a salt content of 1.9 wt. %. Color measurements for the precooked turkey breast were recorded and are reported below.

The precooked turkey breast was submerged for one minute in a browning liquid made of 50% (W/W) Maillose (Red Arrow Co., Manitowoc, Wis.) and water. The coated turkey breast was then exposed to a laser marking system manufactured by Synrad Laser Company, Mukiliteo, Wash. The system had a 130 watt power source, a wave length of 10.6 microns, and a 370 MM. laser lens. The cycle time for the browning was two minutes.

Color measurements for the browned turkey breast were recorded. Following are the Hunter Lab Color-Meter measurements for both the untreated and the browned turkey breast:

|  | L* | A* | B* |
|---|---|---|---|
| Untreated | 82.1 | 1.5 | 14.6 |
| Treated | 48.9 | 11.5 | 29.8 |

The weight of the browned turkey breast was 7.50 pounds, so that the weight loss during browning was 0.8%

EXAMPLE 5

A turkey breast was precooked using the procedure of Example 1. A browning liquid was prepared by mixing a 50% (W/W) solution of Maillose (Red Arrow Co. in Manitowoc, Wis.) and water with a turkey broth solution, in a volume ratio of 90:10/Maillose solution:turkey broth solution. The mixture was then applied on the surface of the product. A 0.25% pick up was targeted.

This coated turkey breast was then exposed to medium range infra-red radiation energy. The Hunter Lab Color-Meter measurement for the browned turkey breast were L*=57.1; A*=8.8; B*=30.7. The product loss was less than 2%.

While the invention has been described in connection with its preferred embodiments, it will be understood that it is not intended to limit this invention thereto, but it is intended to cover all modifications and alternative embodiments falling within the spirit and scope of the invention as expressed in the appended claims.

I claim:

1. A process for browning precooked, whole muscle meat products comprising:
   coating a browning liquid pyrolysis product onto at least a portion of the surface of a precooked whole muscle meat product; and then
   exposing the coated surface to an energy source and selectively heating the coated surface of the whole muscle meat product at a temperature and for a time sufficient to develop a golden-brown color on the exposed surface, without substantial shrinking the precooked, whole muscle meat product.

2. The process in accordance with claim 1 wherein the precooked, whole muscle meat product is selected from the group consisting of poultry, meat, and fish products.

3. The process in accordance with claim 2 wherein the precooked, whole muscle meat product is a precooked turkey breast or a precooked chicken breast.

4. The process in accordance with claim 2 wherein the browning liquid pyrolysis product is obtained from the pyrolysis of hardwoods or sugars.

5. The process in accordance with claim 4 wherein the browning liquid pyrolysis product is obtained from the pyrolysis of dextrose.

6. The process in accordance with claim 4 wherein the amount of browning liquid ranges from about 0.05 to about 1.0 wt. %, based on the weight of the precooked, whole muscle meat product.

7. The process in accordance with claim 6 wherein the amount of browning liquid ranges from about 0.1 to about 0.8 wt. %, based on the weight of the precooked, whole muscle meat product.

8. The process in accordance with claim 2 further comprising the browning liquid pyrolysis product contains a masking agent or flavoring enhancing composition.

9. The process in accordance with claim 3 further comprising the browning liquid pyrolysis product contains from about 0.5 to about 15 wt. % turkey flavor or turkey broth or a mixture of the two.

10. The process in accordance with claim 2 wherein the energy source is a circulating air oven, an impinging air oven, a laser light source, a medium wavelength energy infra red radiation source or a source of microwave radiation.

11. The process in accordance with claim 10 wherein the energy source is a circulating air oven or an impinging air oven.

12. The process in accordance with claim 11 wherein the energy source selectively heats the surface of the meat product by creating an environment having a temperature greater than about 60° C.

13. The process in accordance with claim 12 wherein the energy source selectively heats the surface of the meat product by creating an environment having a temperature from about 100° C. to about 290° C.

14. The process in accordance with claim 13 wherein the energy source selectively heats the surface of the meat product by creating an environment having a temperature from about 150° C. to about 260° C.

15. The process in accordance with claim 2 further comprising prior to exposing the meat product to the energy source, the temperature at the core of the meat product is less than about 5° C. and immediately after browning the meat product, the temperature at the core of the meat product is less than about 13° C.

16. The process in accordance with claim 15 wherein prior to exposing the meat product to the energy source, the temperature at the core of the meat product is less than about 5° C. and immediately after browning the meat product, the temperature at the core of the meat product is less than about 5° C.

17. The process in accordance with claim 1 further comprising predrying the precooked, whole muscle meat product to remove free-water from the product's surface prior to the coating.

18. The process in accordance with claim 2 further comprising predrying the precooked, whole muscle meat product to remove free-water from the product's surface prior to the coating.

19. The process in accordance with claim 6 further comprising predrying the precooked, whole muscle meat product to remove free-water from the product's surface prior to the coating.

20. A process for browning a precooked chicken breast or a turkey breast comprising:

coating at least a portion of the surface of a precooked chicken breast or a precooked turkey breast with from about 0.05 to about 1.0 wt. %, based on the weight of the breast, of a browning liquid pyrolysis product obtained from hardwoods or sugars; and then selectively heating the coated surface of the breast in an environment having a temperature greater than about 60° C. with energy provided by a circulating air oven, an impinging air oven, a laser light source, a medium wavelength energy infra red radiation source or a source of microwave radiation for a time sufficient to develop a golden-brown color on the coated surface, where the shrinkage of the precooked, whole muscle meat product is less than 4 wt. % based on the initial weight of the meat product.

21. The process in accordance with claim 20 wherein the precooked breast is a precooked turkey breast.

22. The process in accordance with claim 21 wherein the browning liquid pyrolysis product is obtained from the pyrolysis of dextrose.

23. The process in accordance with claim 22 wherein the amount of browning liquid ranges from about 0.15 to about 0.3 wt. %, based on the weight of the breast.

24. The process in accordance with claim 20 further comprising the browning liquid pyrolysis product contains a masking agent or flavoring enhancing composition.

25. The process in accordance with claim 22 further comprising the browning liquid pyrolysis product contains from about 0.5 to about 15 wt. % turkey flavor or turkey broth or a mixture of the two.

26. The process in accordance with claim 23 wherein the energy source is a circulating air oven or an impinging air oven.

27. The process in accordance with claim 26 wherein the energy source selectively heats the surface of the breast by creating an environment having a temperature from about 100° C. to about 290° C.

28. The process in accordance with claim 26 wherein the energy source selectively heats the surface of the breast by creating an environment having a temperature from about 150° C. to about 260° C.

29. The process in accordance with claim 20 further comprising prior to exposing the meat product to the energy source, the temperature at the core of the meat product is less than about 5° C. and immediately after browning the meat product, the temperature at the core of the meat product is less than about 13° C.

30. The process in accordance with claim 28 wherein prior to exposing the meat product to the energy source, the temperature at the core of the meat product is less than about 5° C. and immediately after browning the meat product, the temperature at the core of the meat product is less than about 5° C.

31. The process in accordance with claim 1 wherein the shrinkage of the precooked, whole muscle meat product is less than 4 wt. % based on the initial weight of the meat product.

32. The process in accordance with claim 2 wherein the shrinkage of the precooked, whole muscle meat product is less than 1 wt. % based on the initial weight of the meat product.

33. The process in accordance with claim 21 wherein the shrinkage of the precooked, whole muscle meat product is less than 1 wt. % based on the initial weight of the meat product.

34. The process in accordance with claim 20 further comprising predrying the precooked, whole muscle meat product to remove free-water from the product's surface prior to the coating.

35. The process in accordance with claim 21 further comprising predrying the precooked, whole muscle meat product to remove free-water from the product's surface prior to the coating.

36. The process in accordance with claim 22 further comprising predrying the precooked, whole muscle meat product to remove free-water from the product's surface prior to the coating.

* * * * *